United States Patent [19]

Watanabe et al.

[11] Patent Number: 5,103,074
[45] Date of Patent: Apr. 7, 1992

[54] LASER PROCESSING METHOD AND APPARATUS

[75] Inventors: Yoshiaki Watanabe; Hideo Ogino; Kazuo Tsuna; Jun Kataoka; Shozo Katamachi, all of Kanagawa, Japan

[73] Assignee: Nippei Toyama Corporation, Tokyo, Japan

[21] Appl. No.: 442,957

[22] Filed: Nov. 29, 1989

[51] Int. Cl.$^5$ .............................................. B23K 26/00
[52] U.S. Cl. ........................... 219/121.68; 219/121.75; 219/121.8
[58] Field of Search .................. 219/121.68, 121.69, 219/121.74, 121.75, 121.78, 121.79, 121.82, 121.8

[56] References Cited

U.S. PATENT DOCUMENTS

| | | | |
|---|---|---|---|
| 4,383,729 | 5/1983 | Suzuki et al. | 350/96.10 |
| 4,456,812 | 6/1984 | Neiheisel et al. | 219/121.8 X |
| 4,468,551 | 8/1984 | Neiheisel | 219/121.8 X |
| 4,500,771 | 2/1985 | Miller | 219/121.8 X |
| 4,662,708 | 5/1987 | Bagdal | 219/121.8 X |
| 4,914,270 | 4/1990 | Copley et al. | 219/121.8 X |

FOREIGN PATENT DOCUMENTS

| | | |
|---|---|---|
| 102732 | 3/1984 | European Pat. Off. |
| 140663 | 5/1985 | European Pat. Off. |
| 159023 | 10/1985 | European Pat. Off. |

OTHER PUBLICATIONS

Patent Abstracts of Japan, vol. 14, No. 97 (M-940) (4040) Feb. 22, 1990 and JPA 01 306088.
Patent Abstracts of Japan, vol. 6, No. 187 (M-158) (1065) Sep. 25, 1982 and JPA 57 94482.

Primary Examiner—C. L. Albritton
Attorney, Agent, or Firm—Sughrue, Mion, Zinn, Macpeak & Seas

[57] ABSTRACT

With a laser processing apparatus, the membrane of a membrane-covered film is accurately processed with a scanning laser beam linearly both in the direction of conveyance of the film and in a widthwise direction forming an angle with the direction of conveyance simultaneously, and particles splashed or scattered from the membrane by application of the laser beam are positively removed for protection of the film and the laser beam applying heads. A method of applying a scanning laser beam to a workpiece to be processed where the scanning beam is so formed that the portion of the workpiece which is processed with it shows a smooth boundary in the direction of processing.

6 Claims, 9 Drawing Sheets

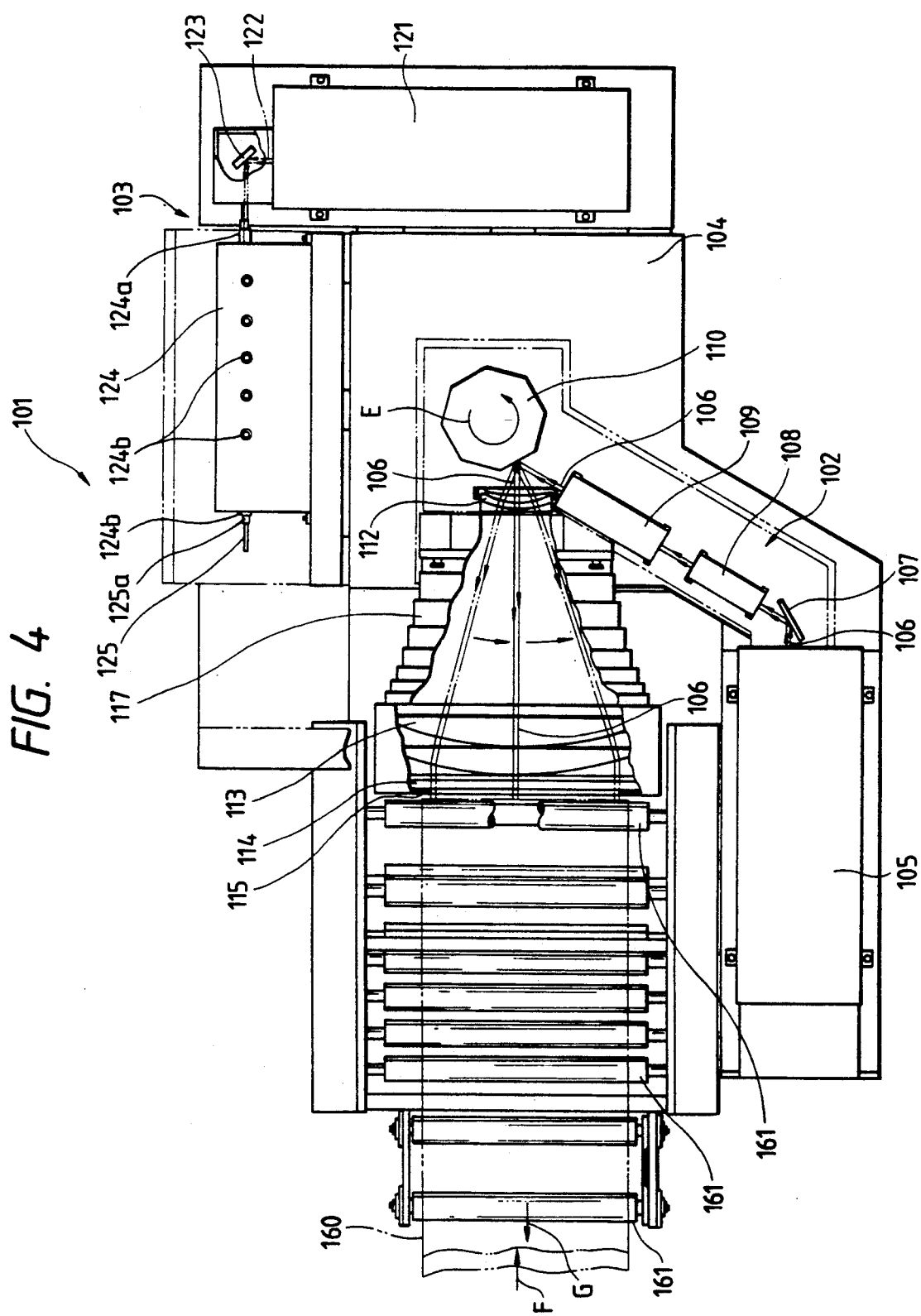

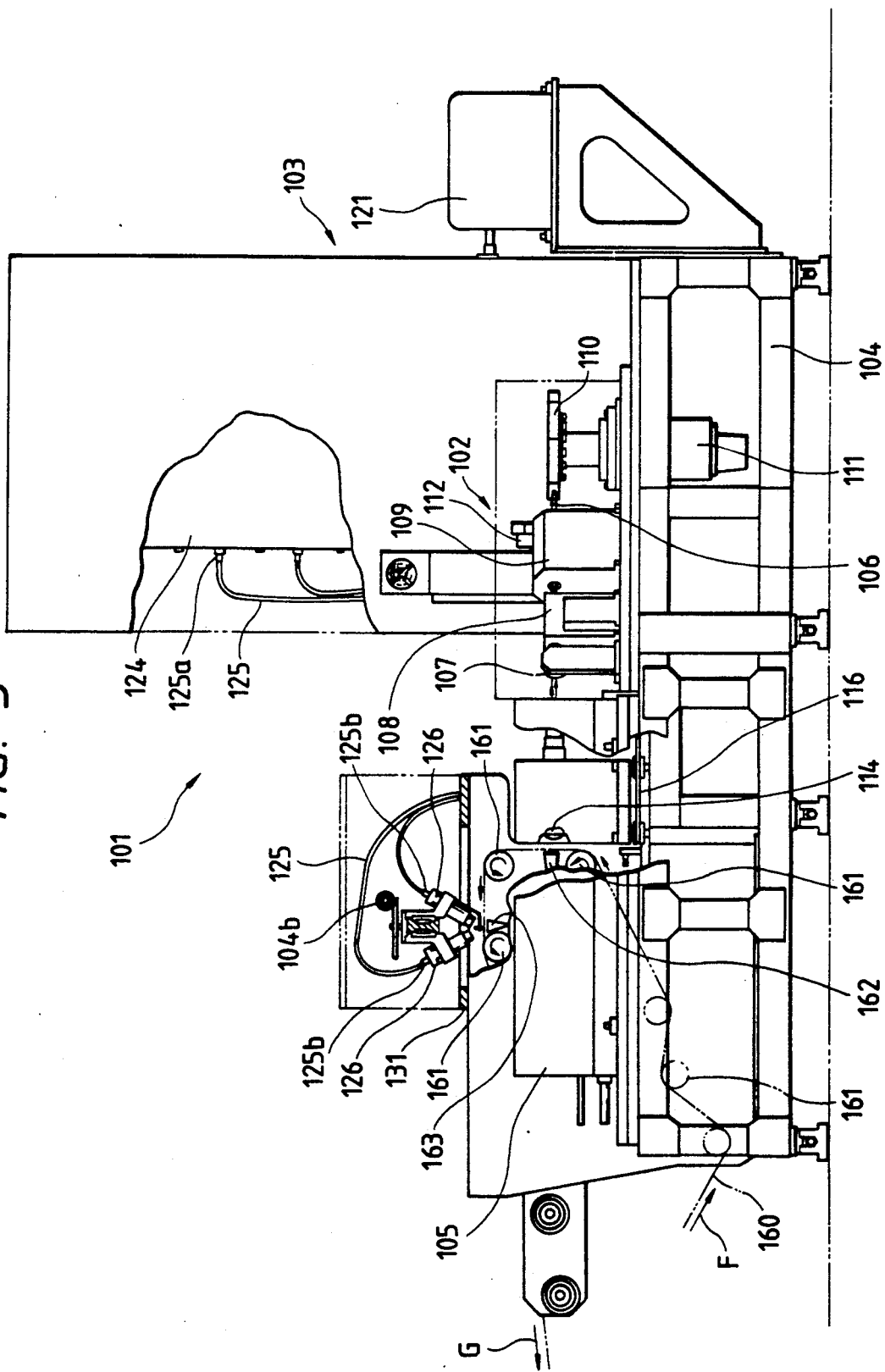

LASER PROCESSING METHOD AND APPARATUS

BACKGROUND OF THE INVENTION

This invention relates to a laser processing apparatus and a laser processing method which are suitable for processing the membrane of a film with a membrane which is used for manufacturing a film capacitor.

One example of a laser processing apparatus of this type is as shown in FIG. 1 (disclosed by Japanese Patent (OPI) No. 35893/1984 (the term "OPI" as used herein means an "unexamined published application").

The laser processing apparatus, as shown in FIG. 1, comprises: a laser oscillator 2 for continuously generating a laser beam L; an optical up collimator for decreasing the divergent angle of the laser beam L and increasing the diameter of the latter L, to provide a parallel laser beam; plane mirrors 4a and 4b for adjusting the direction of advancement of the laser beam L; a polygon mirror 5 for deflecting the laser beam L in a scanning mode; a flat field lens 6 for adjusting the spot size of the laser beam on the irradiation plane; and a cylindrical lens 7 for forming an elliptic laser beam spot.

The laser processing apparatus processes a material 8 as follows: The output laser beam of the laser oscillator 2 is applied to the optical up collimator 3, where the divergent angle of the laser beam L is decreased, and the diameter of the laser beam is increased, to form a parallel laser beam. The output laser beam of the collimator 3 is changed in direction by the plane mirrors 4a and 4b, so that it is applied to a reflecting mirror 5a of the polygon mirror 5. As the polygon mirror 5 rotates, the incident angle of the laser beam L to the reflecting mirror 5a is changed, and accordingly the angle of reflection thereof is also changed. As a result, the laser beam, passing through the flat field lens 6 and the cylindrical lens 7, scans the material 8 being conveyed in the direction of the arrow A (in the direction of conveyance) in such a manner that it goes across the material 8. That is, the laser beam thus applied processes the material in the widthwise direction.

The conventional laser processing apparatus suffers from the following difficulties: The laser beam is deflected only in one direction; that is, it is impossible to process the material 8 with the laser beam longitudinally and laterally; i.e., in the direction of conveyance of the material 8 and in the direction perpendicular thereto simultaneously. Furthermore, in the case where the material 8 is a film on which a membrane is formed, it is difficult for the conventional laser processing apparatus to process it linearly to a width of sub-millimeters.

In addition, with the apparatus, it is impossible to process only the membrane of the film, because the laser oscillator 2 generates the laser beam L continuously.

This difficulty may be overcome by using a Q switch pulse laser oscillator which generates a laser beam in a pulse mode, instead of the laser oscillator 2. In this case, the pulse laser beam is applied to the material 8 as shown in FIG. 2, thus forming a scanning laser beam pattern 10. More specifically, the laser beam pattern is obtained when, while the material 8 to be processed is conveyed in the direction of the arrow B, the Q switch pulse laser beam L is applied thereto in a scanning mode, that is, the pulse laser beam L elliptic in section (as indicated at 10a) is applied successively in a direction D which forms an angle (n) with the direction C which is perpendicular to the direction of the arrow B.

In the scanning laser beam applying method using the laser processing apparatus as described above, in processing the material 8 in a direction perpendicular to the direction of conveyance with the pulse laser beam L forming the elliptic pattern 10a, the direction of the major diameter of the elliptic pattern 10a is in parallel with the aforementioned direction C. Therefore, the elliptic patterns 10a are arranged in the form of a staircase on the material, so that the resultant laser-processed line is not uniform in the processing direction.

One example of the laser processing apparatus of this type is a pattern forming device using a laser beam (disclosed by Japanese Patent Application (OPI) No. 94482/1982).

The pattern forming device 21, as shown in FIG. 3, comprises: a convex lens 23 for increasing the diameter of a laser beam 22a circular in section which is outputted by a laser oscillator (not shown), thus providing a laser beam 22b; a convex lens 24 for converting the laser beam 22b into a parallel laser beam 22c; a cylindrical lens for converting the parallel laser beam 22c into a laser beam 22d elliptic in section; and a cylindrical lens 26 for converting the laser beam 22d into a parallel laser beam 22e elliptic in section. That is, the pattern forming device 21 operates to convert the laser beam 22a circular in section into the laser beam 22e elliptic in section.

The pattern forming device thus constructed is disadvantageous in the following points: It suffers from a difficulty that, whenever it is required to change the configuration of the laser beam 22a which is circular in section and generated by the laser oscillator, thereby to change the laser processing diameter (or to change the laser processing width), it is necessary to replace some of the lenses 23, 24, 25 and 26 to reconstruct the optical system. In addition, when deflecting the laser beam in a scanning mode with a polygon mirror as a reflecting optical system, it is impossible to change the width of the laser beam thereby to change the linear laser processing width into a desired one.

Sometimes, it is required to process a material having a membrane with the laser processing apparatus as follows: That is, it is required to process only the membrane of the material with the laser beam. In this case, heretofore the laser processing operation is carried out with the membrane facing the laser beam.

In this case, the following difficulties are involved: During application of the laser beam, the material being processed is partially scattered, or evaporated, thus damaging itself. This difficulty may be eliminated by the provision of dust absorbing means. However, in this case, the dust absorbing means should not interfere with laser beam applying means and the laser beam path, with the result that the laser processing apparatus is intricate in construction.

SUMMARY OF THE INVENTION

Accordingly, a primary object of this invention is to eliminate the above-described difficulties accompanying a conventional laser processing apparatus.

The foregoing object and other objects of the invention have been achieved by the provision of a laser processing apparatus which, according to a first aspect of the invention, can process only the membrane of a membrane-covered film linearly to a width of the order of sub-millimeters both in the direction of conveyance of the membrane-covered film and in a direction crossing the direction of conveyance simultaneously.

The laser processing apparatus according to the invention operates to process the membrane of a membrane-covered film with a laser beam in the direction of conveyance of the film and in a widthwise direction forming an angle with the direction of conveyance, and it comprises: a widthwise direction Q switch laser processing unit including a widthwise direction Q switch laser oscillator, beam configuration changing means, a polygon mirror, and a lens unit having an f-θ lens and a cylindrical lens; and a conveyance direction Q switch laser processing unit including a conveyance direction Q switch laser oscillator, a laser splitter, a plurality of optical fiber cables, and a plurality of laser beam applying heads.

In the laser processing apparatus, the widthwise direction Q switch laser processing section comprises: the widthwise direction Q switch laser oscillator; the beam configuration changing mechanism; the polygon mirror; the f-θ lens, and the cylindrical lens. The widthwise direction Q switch laser oscillator generates a laser beam with a predetermined period. The laser beam is applied to the beam configuration changing mechanism, so that it is converted into a laser beam elliptic in section. Preferably under the condition that the laser oscillating frequency is synchronous with the speed of rotation of the polygon mirror, the laser beam is reflected by one of the reflecting mirrors of the polygon mirror, and then by the next reflecting mirror. Thus, the laser beam is repeatedly deflected in a scanning mode. The laser beam thus deflected is applied to the f-θ lens so that it scans the membrane-covered film vertically at uniform speed. The laser beam is further applied to the cylindrical lens positioned in conjugation with the polygon mirror so that the tolerance at the image forming position is increased, and the laser beam is converted into a laser beam larger in the ratio of major diameter to minor diameter. The resultant laser beam is applied to the membrane-covered film in a widthwise direction forming an angle with the direction of conveyance of the film, so that the membrane is processed linearly to a width of the order of sub- millimeters.

The conveyance direction Q switch laser processing section comprises: the conveyance direction Q switch laser oscillator; the laser splitter; the optical fiber cables, and the laser beam applying heads. The conveyance direction Q switch laser oscillator generates a laser beam. The laser beam thus generated is divided into a predetermined number of laser beams, which are applied through the optical fiber cables to the laser beam applying heads. Preferably being synchronous with the speed of conveyance of the membrane-covered film to be processed, the laser beams are applied to the latter. As a result, a plurality of parts of the membrane are processed in the direction of conveyance simultaneously.

Thus, with the laser processing apparatus having the widthwise direction Q switch laser processing section and the conveyance direction Q switch laser processing section, the membrane-covered film is processed both in the direction of conveyance and in a direction forming an angle with the direction of conveyance simultaneously.

In order further to achieve the above-described objects and other objects of the invention, a method of applying a scanning laser beam to a workpiece to be processed therewith has been provided according to a second aspect of the invention in which a laser beam elliptic in section is applied, in a scanning mode, to a workpiece in a widthwise direction forming an angle with the direction of conveyance of the workpiece, thereby to process the latter linearly with it, the scanning laser beam is so formed that the portion of the workpiece processed with it shows a smooth boundary in the direction of processing.

In the method of the invention, a laser beam generated by a laser oscillator is deflected in a scanning mode with a reflecting optical system, and in applying the laser beam to the workpiece across the direction of conveyance of the workpiece, the laser beam is converted by beam configuration changing means into a laser beam elliptic in section, and the beam configuration changing means is turned so that the direction of the major diameter of the laser beam elliptic in section coincides with the direction of scan of the laser beam, whereby the direction of the major diameter of the laser beam elliptic in section coincides with the direction of scan applied to the workpiece.

More specifically, in the method of the invention, the pulse laser beam generated by the laser oscillator is converted into a laser beam elliptic in section by the beam configuration changing means, and the laser beam is deflected in a scanning mode by the reflecting optical system so as to be applied to the workpiece in a direction forming an angle with the direction of conveyance thereof, thereby to process the workpiece linearly. In this case, the beam configuration changing means is turned about its optical axis until the direction of the major diameter of the laser beam elliptic in section coincides with the direction of scan of the laser beam which is determined by the speed of scan of the laser beam and the speed of conveyance of the workpiece; that is, the workpiece is processed with the scanning laser beam, the direction of the major diameter of which coincides with the direction of scan thereof. Hence, the portion of the workpiece processed with the scanning laser beam shows a smooth boundary.

In addition, in order to achieve the above-described object and other objects of the invention, a variable beam laser processing apparatus has been provided according to a third aspect of the invention, in which a variety of laser beams elliptic in section which are different in diameter are formed without changing the lenses in the optical system, thereby to perform a variety of laser processing operations different in processing width, or a reflecting optical system is used to deflect the laser beam in a scanning mode thereby to process a workpiece linearly with different widths.

In the variable beam laser processing apparatus, a laser beam generated by a laser oscillator is applied through an incident optical system, a reflecting optical system, and an emergent optical system to a workpiece thereby to process the latter. The incident optical system and/or the emergent optical system has a Y-direction beam configuration changing mechanism for increasing or decreasing the diameter of the laser beam in a Y-direction, and an X-direction beam configuration changing mechanism for increasing or decreasing the diameter of the laser beam in an X- direction perpendicular to the Y-direction.

In the incident optical system and/or the emergent optical system, the Y-direction beam configuration changing mechanism may be positioned before the X-direction beam configuration changing mechanism in the direction of the laser beam, or vice versa.

In the case where, in the incident optical system and/or the emergent optical system in the variable beam laser processing apparatus, the Y-direction beam configuration changing mechanism is positioned on the laser oscillation side while the X-direction beam configuration changing mechanism is positioned on the laser application side, the laser beam circular in section generated by the laser oscillator is increased or decreased in diameter in the Y-direction when passing through the Y-direction laser configuration changing mechanism, and the laser beam which has been increased or decreased in the Y-direction is increased or decreased in diameter in the X-direction when passing through the X-direction beam configuration changing mechanism, whereby a laser beam elliptic in section is obtained. The diameter of the laser beam elliptic in section is adjusted to a desired value by the Y- direction beam configuration changing mechanism; that is, the processing width can be adjusted to a desired value.

In the case where, on the other hand, the X-direction beam configuration changing mechanism is provided on the laser oscillation side while the Y-direction beam configuration changing mechanism is proved on the laser application side, the laser beam circular in section generated by the laser oscillator is increased or decreased in diameter in the X-direction when passing through the X-direction beam configuration changing mechanism, thus being converted into a laser beam elliptic in section, and the laser beam elliptic in section is increased or decreased in diameter in the Y-direction when passing through the Y-direction beam configuration changing mechanism. The diameter of the laser beam elliptic in section is adjusted to a desired value by the Y-direction beam configuration changing mechanism; that is, the processing width can be changed to a desired value.

In the case where a rotary polygon mirror is employed as the reflecting optical system, and the incident optical system has the Y-direction beam configuration changing mechanism and the X- direction beam configuration changing mechanism, the laser beam elliptic in section whose diameter has been adjusted is deflected in a scanning mode by one of the reflecting mirrors of the polygon mirror so as to be applied to the workpiece to process the latter, and then it is deflected in the same manner by the next reflecting mirror to process the workpiece, and so forth. In this processing operation, the processing width is determined to a desired value by the Y-direction beam configuration changing mechanism.

Provided according to a fourth aspect of the invention is a laser processing apparatus which can process the membrane of a membrane-covered laser beam transmitting material with high accuracy without smudging the latter and laser beam applying means.

More specifically, in a laser processing apparatus comprising laser beam applying means for applying a laser beam to a membrane-covered laser beam transmitting material thereby to process the membrane, according to the invention, material guide means are disposed at different positions to guide the membrane-covered laser beam transmitting material, laser beam applying means are arranged between the material guide means in such a manner as to be positioned on the side of the laser beam transmitting material, while dust collecting means are disposed on the side of the membrane of the membrane-covered laser beam transmitting material in such a manner as to confront through the latter with the laser beam applying means.

With the laser processing apparatus thus constructed, the membrane of the membrane-covered laser beam transmitting material is processed with the laser beam applied through the laser beam transmitting material. In the processing operation, particles evaporated or scattered from the membrane are removed by the dust collecting means provided on the side of the membrane. Hence, the membrane-covered laser beam transmitting material and the laser beam applying means are protected from being smudged by the particles evaporated from the membrane.

In this connection, it is preferable that, at least at the laser beam irradiation position, the membrane-covered laser beam transmitting material is guided vertically, or it is guided with the membrane faced downwardly, because the membrane-covered laser beam transmitting material and the laser beam applying means are more positively protected from being smudged by the particles evaporated or splashed from the membrane.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIGS. 4 and 5 are a plan view and a side view, with parts cut away, respectively, showing one example of a laser processing apparatus provided according to a first aspect of this invention;

DETAILED DESCRIPTION OF THE INVENTION

Figure 1:
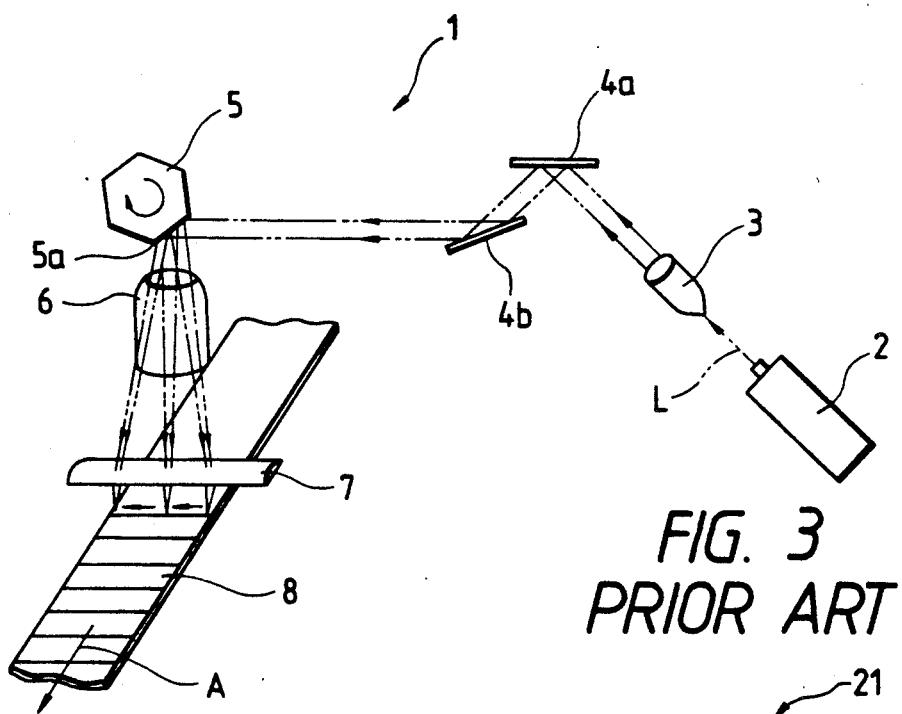
FIG. 1 is an explanatory diagram showing the arrangement of a conventional laser processing apparatus.
Figure 3:
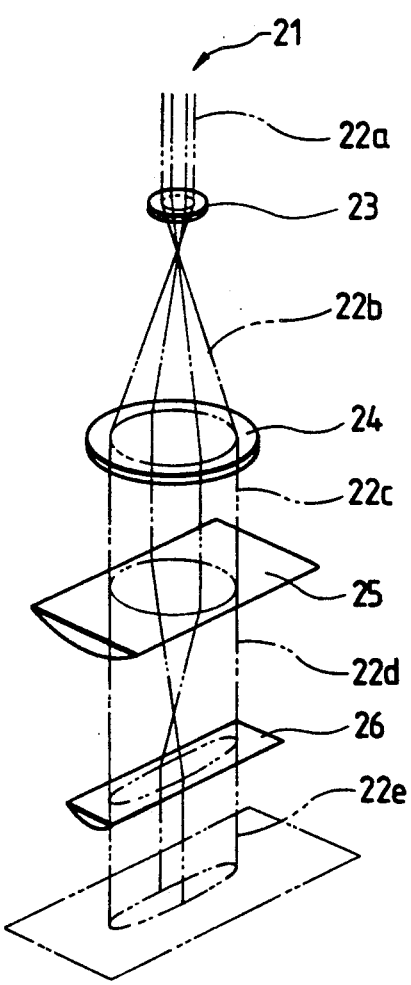
FIG. 3 is an explanatory diagram for a description of one example of the conventional laser processing apparatus.
Figure 2:
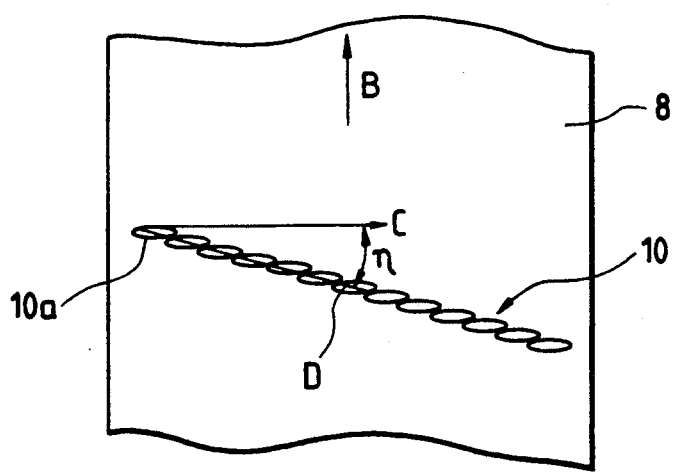
FIG. 2 is an explanatory diagram for a description of a conventional method of applying a scanning laser beam to a workpiece.
Figure 6:
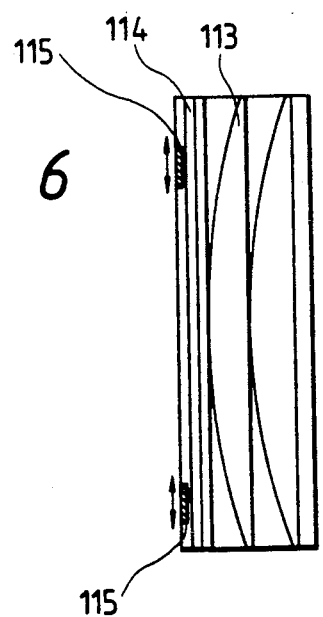
FIG. 6 is an explanatory diagram showing the slit of a widthwise direction Q switch laser processing section shown in FIGS. 4 and 5.

One example of a laser processing apparatus according to this invention will be described with reference to FIGS. 4 through 8.

As shown in FIGS. 4 and 5, the laser processing apparatus 101 according to the invention has a widthwise direction Q switch laser processing section 102 and a conveyance direction Q switch laser processing section 103 (hereinafter referred to as "first and second Q switch laser processing sections 102 and 103", respectively, when applicable) mounted on a common base 104.

The first Q switch laser processing section 102 comprises: a widthwise direction Q switch laser oscillator (a Q switch YAG laser oscillator in the example) 105; a reflecting mirror 107 for reflecting in a desired direction the laser beam 106 which is generated in a pulse oscillation mode by the laser oscillator 105; a Y-direction beam configuration changing mechanism 108 which contracts or enlarges the configuration of the pulse laser beam 106 in a Y-direction which has been reflected by the reflecting mirror 107; an X-direction beam configuration changing mechanism 109 for contracting or enlarging the configuration of the pulse laser beam in an X-direction which has passed through the Y-direction beam configuration changing mechanism 108; and a polygon mirror 110 which is rotated in the direction of the arrow E while receiving the laser beam 106 which has passed through the X-direction beam configuration changing mechanism 109. The polygon mirror 110 is rotated by a drive means 111. In this case, the apparatus may be so designed that the X-direction laser configuration changing mechanism 109 is turned around its axis through a predetermined angle, and the laser beam 106 made elliptic in section by the X-direction beam configuration changing mechanism is adjusted in the angle of inclination in the direction of its major diameter. As the case may be, it is desirable to make the angle of rotation of the polygon mirror 110 synchronous with the Q switch frequency of the widthwise direction Q switch laser oscillator 105.

The widthwise direction Q switch laser processing section 102 further comprises: an f·θ lens 112 to which the laser beam 106 is applied which has passed through the two mechanisms 108 and 109 in the above-described manner and has been deflected in a scanning mode by the polygon mirror 110; a workpiece vicinity lens 113 to which the laser beam 106 is applied which has passed through the f·θ lens 112; a cylindrical lens 114 to which the laser beam 106 is applied which has passed through the lens 113; and slit members 115 for determining a width of scan for the laser beam 106 which has passed through the cylindrical lens 114. The cylindrical lens 114, and the work vicinity lens 113 forming an f·θ lens system with the above-described f·θ lens 112 are made movable on rails 116 in the axial direction of the f·θ lens system, and they are covered with a bellows 117. The slit members 115 are made movable in the directions of the arrows in FIG. 6, so as to determine a laser beam scanning width; i.e, a laser beam processing width.

On the other hand, the second Q switch laser processing section 103 comprises: a conveyance direction Q switch laser oscillation (a Q switch YAG laser oscillator in the embodiment) 121; a reflecting mirror 123 for reflecting the laser beam 122 in a desired direction which is outputted in a pulse oscillation mode by the laser oscillator 121; and a laser splitter 124 which receives the laser beam through a laser beam inlet 124a which has been reflected by the reflecting mirror 123. The laser splitter 124 splits the laser beam 122 into a predetermined number of beams, which are outputted through laser beam outlets 124b, respectively.

The laser beam outlet 124b of the laser splitter 124 are connected to the laser beam incident ends 125a of a plurality of optical fiber cables 125, respectively, the laser beam emergent ends 125b of which are connected to a plurality of laser beam irradiation heads 126 forming the above-described conveyance direction Q switch laser processing section 103.

The arrangement of the laser beam irradiation heads 126 and their relevant components will be described with reference to FIGS. 7 and 8.

Figure 8:
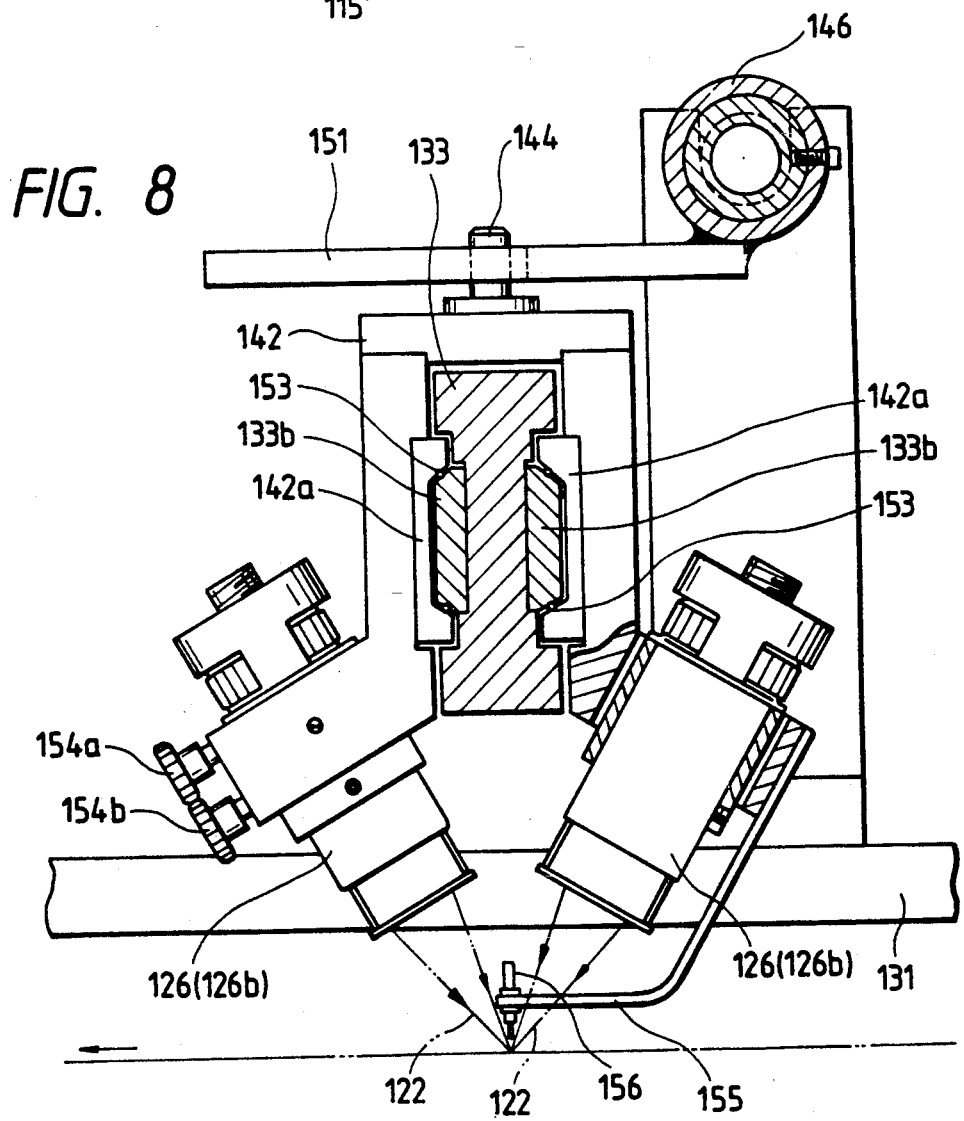
FIG. 8 is a front view, with parts cut away, showing the laser beam applying heads and their relevant mechanisms in the conveyance direction Q switch laser processing section.
Figure 7:
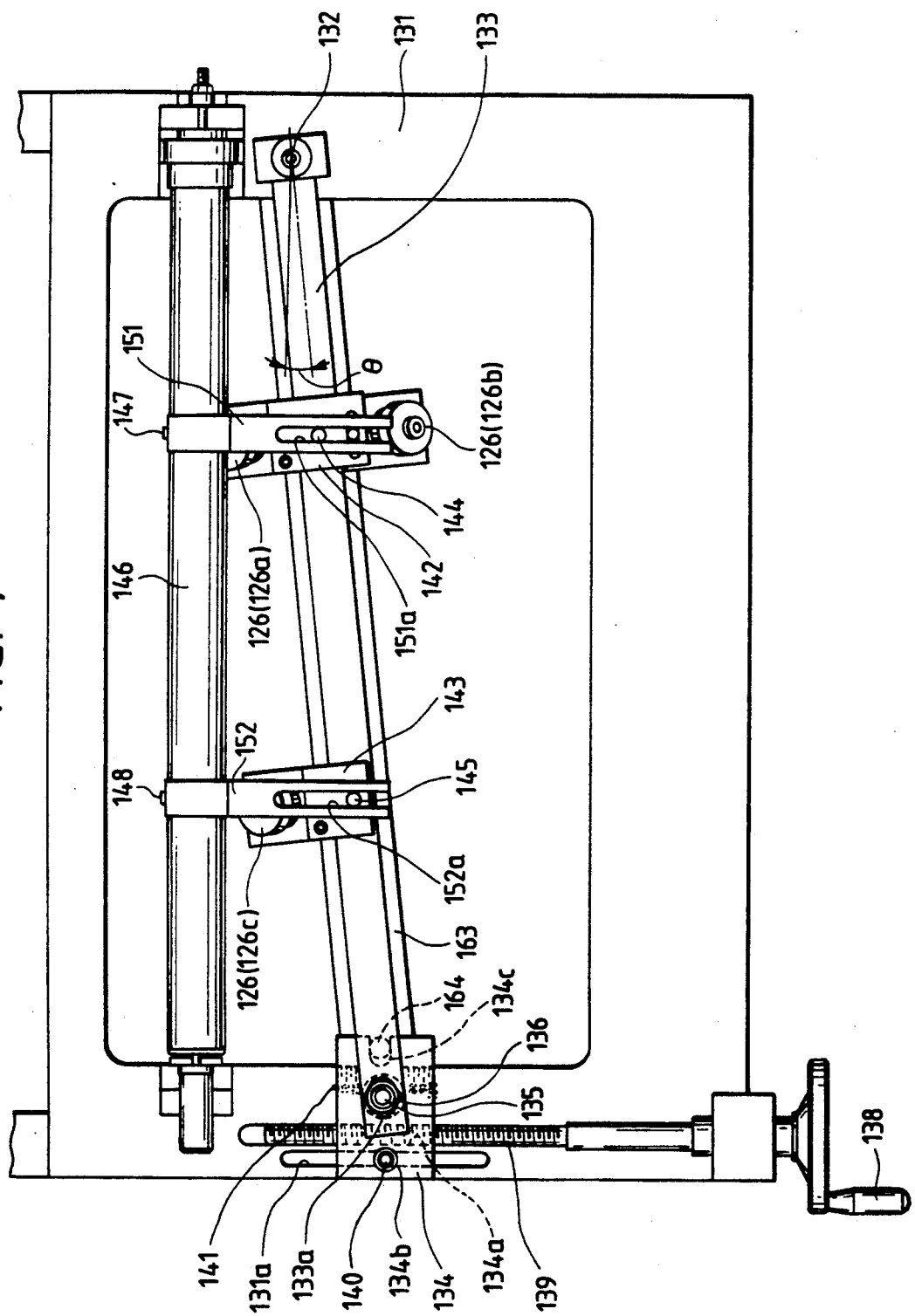
FIG. 7 is a plan view showing a position adjusting mechanism for laser beam applying heads in a conveyance direction Q switch laser processing section shown in FIGS. 4 and 5.

A frame 131 shown in FIGS. 7 and 8 is secured to the base 104 shown in FIGS. 4 and 5. The frame 131 has a support pin 132, on which an arm 133 is rotatably mounted at one end. The arm 133 has an elongated hole 133a at the other end, in which a support pin 135 embedded in a positioning member 134 is fitted slidably in the longitudinal direction of the elongated hole 133a, and is engaged with a nut 136 so that it may not come off the arm 133. The positioning member 134 is female-threaded as indicated at 134a so that it is engaged with a feed screw 139 which has a handle 138 so as to be slidable over the frame 131. An elongated groove 131a is formed in the portion of the frame 131 over which the positioning member is slid. The positioning member 134 is fixed with a fixing screw 140 which is inserted into the groove 131a and engaged with a threaded hole 134b formed in the positioning member. The frame 131 has a scale 141 marked on it, so that the positioning member 134 can be readily positioned, and the angle of inclination θ of the arm 133 can be readily determined.

As shown in FIG. 7, an irradiation head holder 142 holding two laser beam irradiation heads 126 (126a and 126b) is mounted on the arm 133 in such a manner that it is extended across the arm 133 and is movable in the longitudinal direction of the latter 133; and in addition an irradiation head holder 143 holding one laser beam irradiation head 126 (126c) is mounted on the arm 133 in such a manner that it is positioned along the arm 133 and is movable in the longitudinal direction of the latter 133. Cylindrical slide pins 144 and 145 are provided on top of the irradiation head holders 142 and 143 in such a manner that they are positioned on the line connecting the axial centers of the support pins 132 and 135. The slide pins 144 and 145 thus provided are engaged with conveyance direction guide grooves 151a and 152a which are formed in holder guides 151 and 152, respectively. The holder guides 151 and 152 are secured to a guide shaft 146 with male screws 147 and 148, respectively, which is provided on the frame 131. The irradiation head holders 142 and 143 have holder-side slide members 142a and 143a (the slide member 143a not shown), respectively, which are slidably mounted on arm-side slide members 133b provided on the arm 133 with balls 153 interposed therebetween. The direction of the optical axis of each of the laser beam irradiation heads 126 held by the irradiation head holder 142 can be finely adjusted with angle adjusting knobs 154a and 154b. For instance, the optical axes of the laser beam irradiation heads 126a and 126b can be coincided with each other as shown in FIG. 8, or may be shifted from each other, thereby to adjust the laser beam processing width or interval in processing a workpiece with the laser beam in the direction of conveyance. The irradiation head holder 142 has a position sensor 156 for detecting the positions of irradiation by the output laser beams 122 of the laser beam irradiation heads 126 (126a and 126b).

The laser beam irradiation heads 126 (126a, 126b and 126c) are mounted on the irradiation head holders 142 and 143, respectively, in such a manner that the optical axes of the output laser beams 122 of these laser beam irradiation heads 126 are on the line connecting the axial centers of the cylindrical slide pins 144 and 145 (i.e., the axial centers of the support pins 132 and 135). The laser beam irradiation heads 126 (126a, 126b and 126c) are connected to the laser beam emergent ends 125b of the optical fiber cables 125, the laser beam incident ends 125a of which are connected to the laser beam splitter 124 as shown in FIG. 5.

A plurality of conveying rollers 161 are provided on the base 104 to convey a membrane-covered film 160 (hereinafter referred to merely as "a film 160", when applicable). As shown in FIGS. 4 and 5, the film 160 is conveyed in the direction of the arrow F, so that it is moved across the cylindrical lens 114 and then passed near the laser beam irradiation heads 126 (126a, 126b and 126c) horizontal, and it is conveyed in the direction of the arrow G.

In the embodiment, the film 160 comprises: a film base of polyester; and a membrane of aluminum. That is, the film 160 is formed by vacuum-depositing aluminum on the film base. The film 160 is conveyed with the film base faced towards the cylindrical lens 114. A dust collecting duct 162 connected to a dust collector (not shown) is positioned in such a manner that it is confronted through the film 160 with the cylindrical lens 114. The provision of the dust collector eliminates the difficulty that, in processing the membrane of the film with the laser beam 106, the splashes therefrom stick to the cylindrical lens 114, and improves the dust collecting efficiency.

The film 160 passes by the laser beam irradiation heads 126 (126a, 126b and 126c) with the film base faced towards the latter 126 (i.e., with the membrane not faced towards the laser beam irradiation heads 126). And a dust collecting duct 163 connected to the dust collector (not shown) is disposed in such a manner that it is confronted through the film 160 with the laser beam irradiation heads 126. As shown in FIG. 7, the dust collecting duct 163 is coupled, at one end, to the support pin 132 on the frame 131 so that it is swingable about the support pin 122, and has a slide pin 164 at the other end. The slide pin 164 is inserted in an U-shaped groove 134 formed in the positioning member 134, so that the dust collecting duct 163 is moved together with the arm 133.

In conveying the film 160, the membrane may be faced towards the cylindrical lens 114. In this case, the dust collecting duct 162 is positioned on the side of the cylindrical lens 114 where it will not intercept the path of irradiation of the laser beam. In the vicinity of the laser beam irradiation heads 126, the membrane of the membrane-covered film 160 is faced towards the laser beam irradiation heads 126, and therefore the dust collecting duct 163 is positioned on the side of the laser beam irradiation heads 126 where it will not intercept the path of irradiation of the laser beam.

Now, a procedure of processing the membrane of the membrane-covered film 160 on the laser processing apparatus thus constructed will be described.

The film 160 is conveyed by the conveying rollers 161 in the direction of the arrow F in FIGS. 4 and 5. In this case, the film 160 is supplied into the laser processing apparatus 101 with the membrane faced upwards, and it is conveyed over the cylindrical lens 114 in the widthwise direction Q switch laser processing section 102.

In this operation, the laser beam 106 oscillated with a predetermined period by the widthwise direction Q switch laser oscillator 105 is reflected by the reflecting mirror 107, and the laser beam thus reflected is contracted in the Y-direction by the Y-direction beam configuration changing mechanism 108, and enlarged in the X-direction by the X-direction beam configuration changing mechanism 109 into a laser beam elliptic in section. The laser beam thus shaped is repeatedly reflected by the polygon mirror 110; that is, it is deflected in a scanning mode. The laser bean is made uniform in speed over the surface of the film 160 by the f·θ lens, and is passed through the workpiece vicinity lens 113 and then the cylindrical lens 114, so that it is converted into a laser beam elliptic in section which is larger in the ratio of major diameter to minor diameter. The resultant laser beam is adjusted in scanning width by the slit members 115, and applied to the film base of the film 160 passing near the slit members 115 (i.e., the cylindrical lens 114). In response to the application of the laser beam, the corresponding part of the membrane of the film 160 is scattered, or removed, from it. Thus, the widthwise direction laser processing operation has been achieved. If necessary, the Q switch laser oscillator 105 is turned on and off, or a mechanical shutter (not shown) is operated, so that the laser processing operation is carried out intermittently. As the case may be, the X-direction beam configuration changing mechanism 109 may be turned about its axis so that the direction of the major diameter of the elliptic laser beam is in alignment with the lateral processing direction (which is the processing angle determined by the laser beam scanning speed; i.e., the speed of rotation of the polygon mirror, and the speed of conveyance of the film 160). In this case, the portion of the film which is processed with the laser beam shows a smoother boundary, and the processing speed is increased. In the above-described laser beam processing operation, the material scattered from the film is removed through the dust collecting duct 162, and the film 160 is conveyed over the laser beam irradiation heads 126 in the conveyance direction Q switch laser processing section 103.

In this case, the laser beam 122 generated with a predetermined period by the conveyance direction Q switch laser oscillator 121 is reflected by the reflecting mirror 123, and is then split into a plurality of laser beams 122. The laser beams thus formed are applied through the optical fiber cables 125 to the laser beam irradiation heads 126 (126a, 126b and 126c), respectively, so that they are applied to the film base of the film 160, whereupon the membrane of the film 160 is partially scattered, i.e., removed. Thus, the conveyance direction laser processing operation has been accomplished. The Q switch laser oscillator 121 is turned on and off (or a mechanical shutter (not shown) is operated as the case may be), so that the laser processing operation is carried out intermittently. In the laser processing operation, the material scattered from the film is removed through the dust collecting duct 163, while the film 160 is conveyed in the direction of the arrow G.

In the conveyance direction laser processing operation, by operating the handle 138 with the fixing screw 140 loosened, the angle of inclination $\theta$ of the laser beam 122 at the irradiation position is adjusted. The irradiation head holders 142 and 143 are slidably mounted on the arm 133, and the slide pins 144 and 145 of the irradiation head holders 142 and 143 are slidably fitted in the conveyance direction guide grooves 151a and 152a of the holder guides 151 and 152, respectively. Therefore, when the arm is swung by operating the handle 138, the laser beams 122 emerging from the laser beam irradiation heads 126 describe linear loci in the direction of conveyance instead of arcuate loci.

In the above-described laser processing operation, the speed of conveyance of the film 160 may be controlled by the feedback of the speed of rotation of the polygon mirror 110, the oscillation frequencies of the Q switch laser oscillators 105 and 121, and the laser output, if necessary.

As was described above, the laser processing apparatus for processing the membrane of a membrane-covered film with a laser beam in the direction of conveyance of the film and in a widthwise direction crossing the former, according to the invention, comprises: the widthwise direction Q switch laser processing section which includes the widthwise direction Q switch laser oscillator, the beam configuration changing mechanism, the polygon mirror, the f-$\theta$ lens, and the cylindrical lens; and the conveyance direction Q switch laser processing section which includes the conveyance direction Q switch laser oscillator, the laser splitter, the plurality of optical fiber cables, and the plurality of laser beam irradiation heads. Therefore, with the apparatus, the membrane-covered film can be processed with the laser beam both in the direction of conveyance and in the widthwise direction simultaneously. Employing the Q switch laser oscillators, the apparatus can produce an extremely short pulse laser beam continuously. Therefore, only the membrane of the membrane-covered film can be processed to a width of the order of sub-millimeters continuously.

Now, one example of a scanning laser beam applying method according to the invention will be described with reference to FIGS. 9 and 10.

Figure 9:
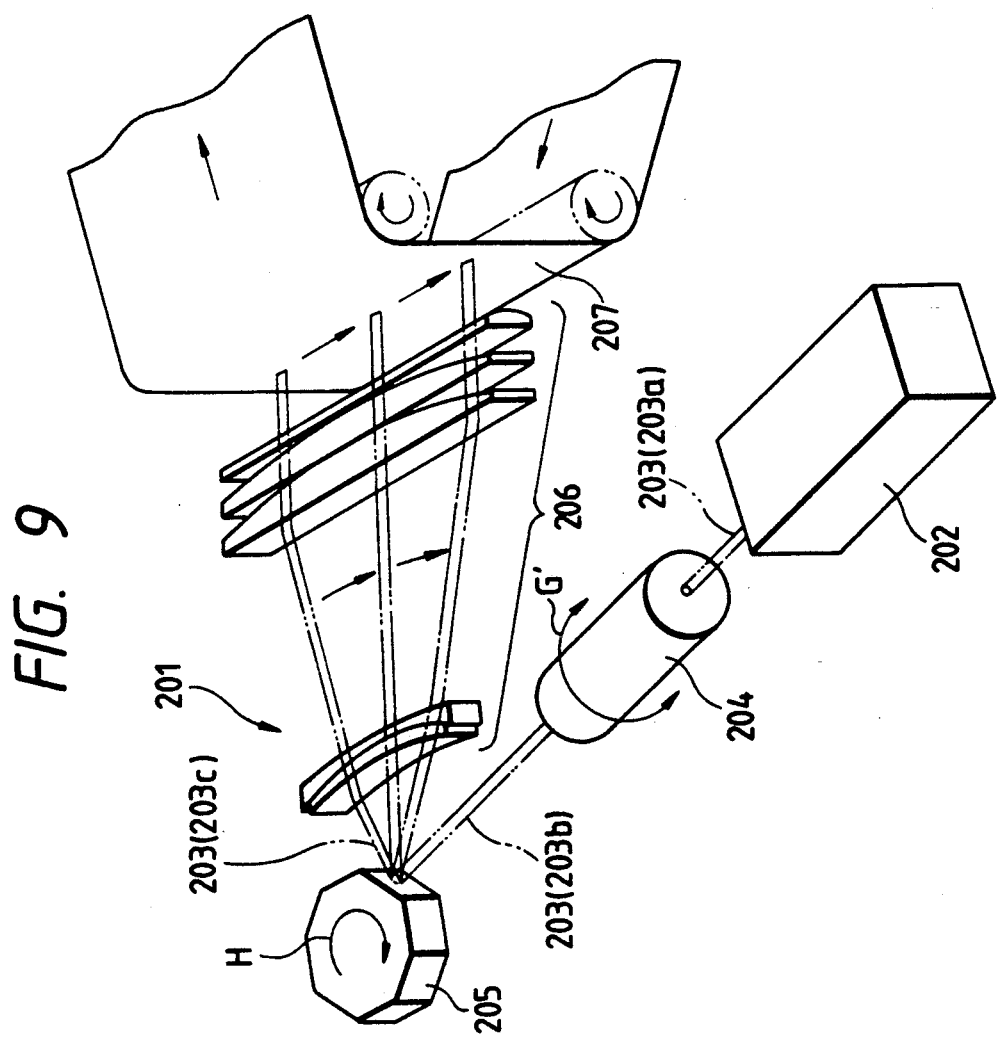
FIG. 9 is an explanatory diagram for a description of a method of applying a scanning laser beam to a workpiece according to a second aspect of the invention.

FIG. 9 shows a laser processing apparatus 201 for practicing the scanning laser beam applying method according to the invention. The apparatus 201 comprises: a Q switch laser oscillator 202; and a beam configuration changing means 204 for converting the pulse laser beam 203 (203a) outputted by the Q switch laser oscillator into a laser beam 203 (203b) elliptic in section. The beam configuration changing means 204 is turned about its optical axis in the direction of the arrow G' by a drive unit (not shown).

The laser processing apparatus 201 further comprises: a reflecting optical system 205 which is rotated in a horizontal plane in the direction of the arrow H' by a drive unit (not shown). In the embodiment, the reflecting optical system 205 is a polygon mirror with a plurality of reflecting mirrors. The reflecting mirrors of the reflecting optical system 205 successively reflect the laser beam 203b which is made elliptic in section by the beam configuration changing means 204, thereby to deflect the laser beam in a scanning mode; i.e., to provide a scanning laser beam 203 (203c) elliptic in section.

The laser processing apparatus 201 comprises a light-gathering optical system 206 consisting of a number of lenses to apply the scanning laser beam 203c to the surface of a workpiece 207 to be processed.

In processing the workpiece 207 with the laser processing apparatus 201 thus constructed, first the laser beam 203a is generated by the Q switch laser oscillator 202. The laser beam 203a thus generated is applied to the beam configuration changing means 204, where it is converted into the laser beam 203b elliptic in section. The laser beam 203b is repeatedly reflected by the reflecting mirrors of the reflecting optical system (the polygon mirror) 205 rotating in the direction of the arrow H', thus providing the scanning laser beam 203c. The scanning laser beam 203c is applied through the light-gathering optical system 206 to the workpiece 207, to process the latter 207 as required. In this operation, the beam configuration changing means 204 is turned about its optical axis in the direction of the arrow G', so that the direction of the major diameter of the scanning laser beam 203c elliptic in section coincides with the direction of scan of the scanning laser beam 203c which is determined by the speed of scan of the scanning laser beam 203c on the surface of the workpiece 207 and the speed of conveyance of the latter 207. Under this condition, the scanning laser beam 203c is applied to the workpiece 207 to process the latter 207.

Figure 10:
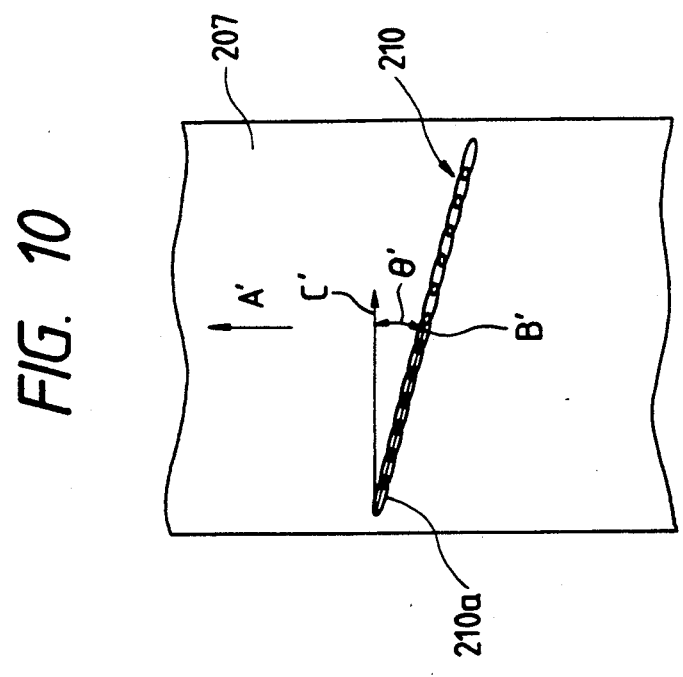
FIG. 10 is an explanatory diagram showing a scanning laser beam pattern formed on a workpiece in the method of the invention.

In the scanning laser beam applying method of the invention, the laser beam irradiation pattern formed on the surface of the workpiece 207 is for instance shown in FIG. 10.

The laser beam irradiation pattern 210 is formed as follows: An elliptic laser beam pattern 210a is formed by each pulse laser beam produced. The elliptic laser beam patterns 210a thus formed are successively reflected by the plurality of reflecting mirrors of the reflecting optical system (the polygon mirror) 205, thus being arranged in a line. The direction of the arrangement of the elliptic laser beam patterns 210a (i.e., the direction of the arrow B') is determined by the speed of scan of the elliptic laser beam patterns 210a (i.e., the speed of rotation of the reflecting optical system (the polygon mirror)) and the speed of conveyance of the workpiece 207. In the embodiment, the direction of scan (B') forms an angle $\theta$ with the direction (of the arrow C') which is perpendicular to the direction of conveyance (the direction of the arrow A') of the workpiece.

In applying the scanning laser beam 203c elliptic in section through the light-gathering optical system 206 to the workpiece 207 with the reflecting optical system (the polygon mirror) 205 rotated, the beam configuration changing means 204 (FIG. 9) is turned about its optical axis (in the direction of the arrow G') so that the direction of the major diameter of the scanning laser beam 203c coincides with the direction of scan of the scanning laser beam 203c, whereby the portion of the workpiece processed with the laser beam shows a smoother boundary.

As was described above, in the scanning laser beam applying method of the invention, when the pulse laser beam generated by the laser oscillator is deflected in a scanning mode by the reflecting optical system so that it is applied to the workpiece in a direction forming an angle with the direction of conveyance of the latter, the pulse laser beam is converted into the laser beam elliptic in section by the beam configuration changing means, and the beam configuration changing means is turned so that the direction of the major diameter of the laser beams elliptic in section coincides with the direction of scan of the laser beam; that is, the direction of the major diameter of the scanning laser beam elliptic in section coincides with the direction of scan applied to the workpiece. Hence, the laser beam irradiation pattern on the workpiece is like a smooth line; that is, the portion of the workpiece which is processed with the laser shows a smooth boundary. Furthermore, in the method of the invention, the width of the scanning laser beam in the direction of the major diameter can be effectively utilized, and therefore the scanning speed can be increased; that is, the laser processing operation can be achieved with high efficiency.

One example of a variable beam laser processing apparatus according to the invention will be described with reference to FIGS. 11 and 12.

Figure 11:
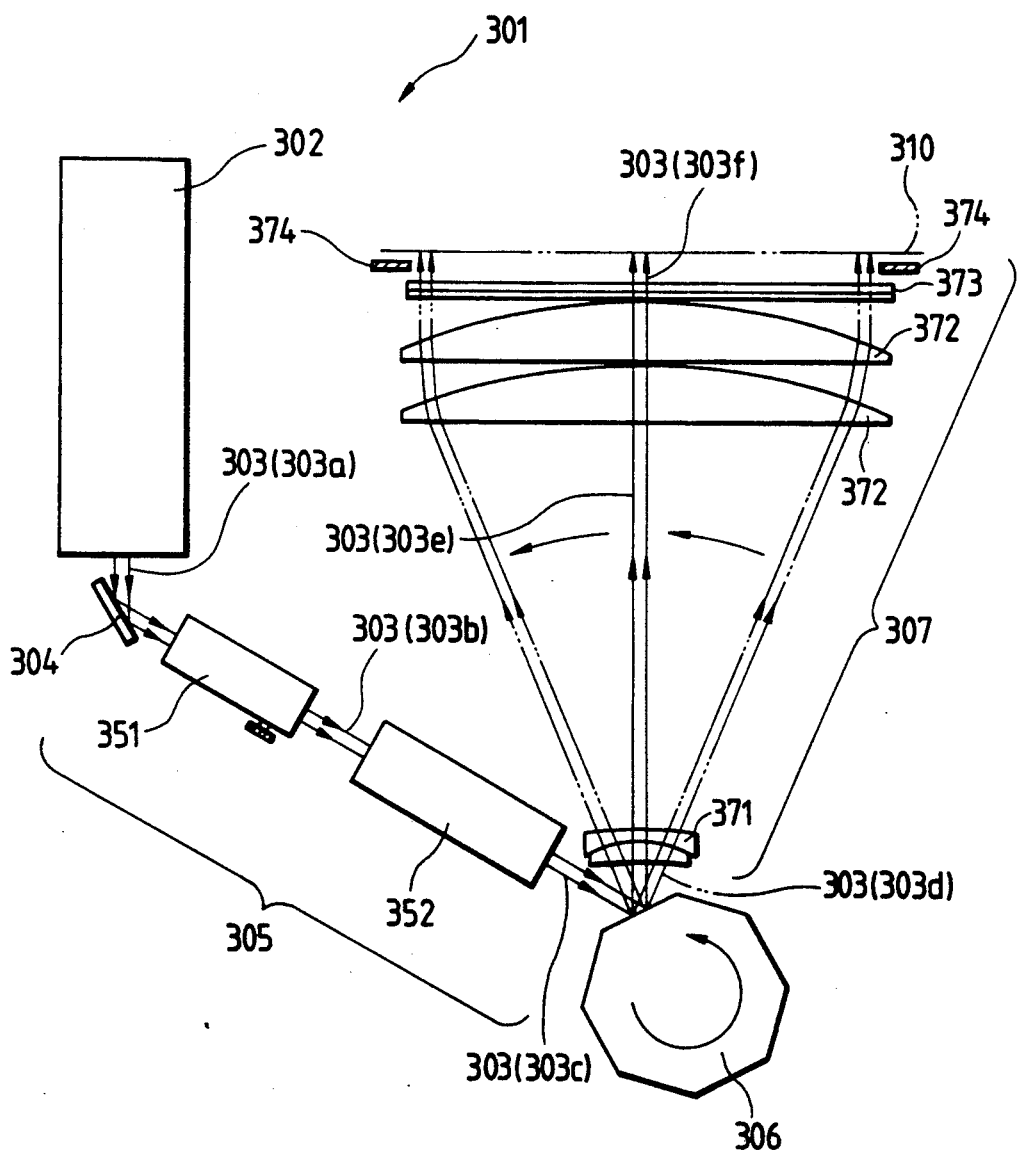
FIG. 11 is an explanatory diagram showing the fundamental arrangement of a variable beam laser processing apparatus according to a third aspect of the invention.

As shown in FIG. 11, a variable beam laser processing apparatus according to the invention comprises: a laser oscillator 302; a reflecting mirror 304 for changing the direction of a laser beam 303 (303a) generated by the laser oscillator 302; an incident optical system 305 for transmitting the laser beam 303 (303a) reflected from the reflecting mirror 304; a reflecting optical system 306 for reflecting the laser beam 303 (303C) passed through the incident optical system 305; and an emergent optical system 307 for transmitting the laser beam 303 (303d) reflected by the reflecting optical system 306.

The incident optical system 305 comprises: a Y-direction beam configuration changing mechanism 351 for adjusting the beam diameter of the laser beam 303 (303a) reflected from the reflecting mirror 304; i.e., increasing or decreasing the beam diameter in the Y-direction; and an X-direction beam diameter changing mechanism 352 which increases or decreases the beam diameter of the laser beam 303 (303b) in an X-direction perpendicular to the Y-direction whose beam diameter has been adjusted in the Y- direction by the Y-direction beam configuration changing mechanism 351.

The reflecting optical system 306 comprises a polygon mirror with a plurality of reflecting mirror in the embodiment. The reflecting mirrors of the polygon mirror successively reflect the laser beam 303 (303c) outputted by the incident optical system 305. More specifically, the laser beam 303c is reflected by one of the reflecting mirrors of the polygon mirror to achieve the first scanning operation, the same laser beam is reflected by the next reflecting mirror to achieve the second scanning operation, and so forth. The laser beam 303 (303d) thus reflected is applied to the emergent optical system 307.

The emergent optical system 307 comprises: an f·θ lens 371 for causing the laser beam 303 (303d) to scan a workpiece 310 at equal speed; workpiece vicinity lenses 372; a cylindrical lens 373 for increasing the tolerance permitted at the image forming position, and converting the laser beam into a laser beam 303 (303f) elliptic in section which is larger in the ratio of major diameter to minor diameter; a slit member 374 having an adjustable opening.

A procedure of processing a workpiece 310 with the variable beam laser processing apparatus thus constructed will be described with reference to FIGS. 12A through 12D.

Figure 12A:
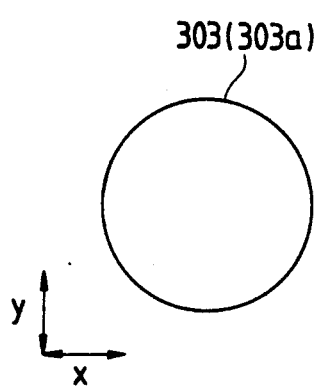
FIGS. 12A through 12D are explanatory diagrams showing the configurations of laser beams at various parts of the variable beam laser processing apparatus shown in FIG. 11.
Figure 12B:
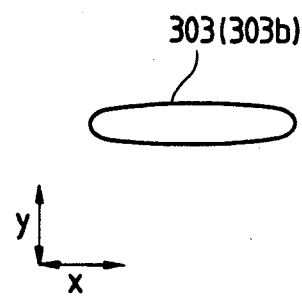
Figure 12C:
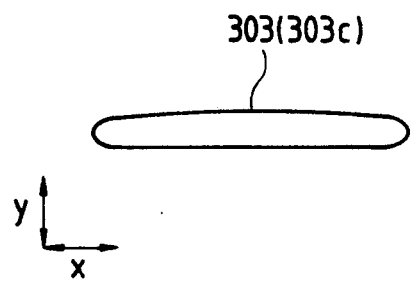

The laser beam 303 (303a) generated by the laser oscillator 302 is circular in diameter as shown in FIG. 12A. The laser beam 303a circular in diameter is reflected by the reflecting mirror 304 so as to be applied to the incident e optical system 305. In the incident optical system 305, the diameter of the laser beam 303a is decreased in the Y-direction by the Y-direction beam configuration changing mechanism 351 as shown in FIG. 12B; that is, the laser beam 303a is converted into a laser beam 303b as shown in FIG. 12B, and then the laser beam 303b is enlarged in the X-direction perpendicular to the Y-direction as shown in FIG. 12C; that is, the laser beam 303b is converted into a laser beam 303c elliptic in section as shown in FIG. 12C.

Figure 12D:
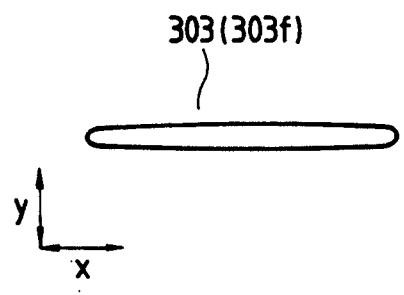

The laser beam 303c elliptic in section, being repeatedly reflected by the reflecting optical system 306; i.e., the plurality of mirrors of the polygon mirror, is repeatedly deflected in a scanning mode. The laser beam thus deflected is applied, as a laser beam 303d, to the emergent optical system 307. In the emergent optical system 307, the laser beam 303d is applied to the f·θ lens 371 so that it will scan the workpiece 310 at equal speed. The laser beam is further applied to the workpiece vicinity lens 372 and the cylindrical lens 373, so that it is converted into a laser beam 303f which is larger in the ratio of major diameter to minor diameter as shown in FIG. 12D. The laser beam 303f, after being adjusted in scanning width by the slit member 374, scans the workpiece 310. Thus, the workpiece 310 is processed linearly with the laser beam.

When, in a linear processing operation, the beam diameter is increased in the Y-direction by the Y-direction beam configuration changing mechanism 351, the processing width (perpendicular to the direction of the line) is increased; whereas when the beam diameter is decreased in the Y-direction by the Y-direction beam configuration changing mechanism 351, then the processing width is decreased. Adjustment of the processing width can be freely performed during the linear processing operation.

In the above-described embodiment, the reflecting optical system 306 made up of the polygon mirror deflects the laser beam in a scanning mode whereby the workpiece is processed linearly. However, the reflecting optical system 306 may be a simple reflecting mirror. In this case, the laser processing width can be changed by adjusting the Y-direction beam configuration changing mechanism.

Furthermore, in the above-described embodiment, the Y-direction beam configuration changing mechanism 351 and the X-direction beam configuration changing mechanism 352 are provided only in the incident optical system 305; however, it should be noted that the invention is not limited thereto or thereby.

As was described above, with the variable beam laser processing apparatus according to the invention, the laser beam generated by the laser oscillator is applied through the incident optical system, the reflecting optical system and the emergent optical system to the workpiece in a scanning mode, thereby to process the latter. The incident optical system and/or the emergent optical system includes the Y-direction beam configuration changing mechanism for changing (increasing or decreasing) the diameter of the laser beam in the Y-direction, and the X- direction beam configuration changing mechanism for changing (increasing or decreasing) the diameter of the laser beam in the X-direction. Hence, when the Y-direction beam configuration changing mechanism is operated, a variety of laser beams elliptic in section different in diameter can be obtained, and accordingly workpieces can be processed with a variety of processing widths. In addition, during a laser processing operation, the processing dimension or width can be changed. That is, in the invention, unlike the prior art, it is unnecessary to reconstruct the optical system.

One example of a laser processing apparatus according to the invention which is used to process a laser beam transmitting material covered with a membrane will be described with reference to FIG. 13.

Figure 13:
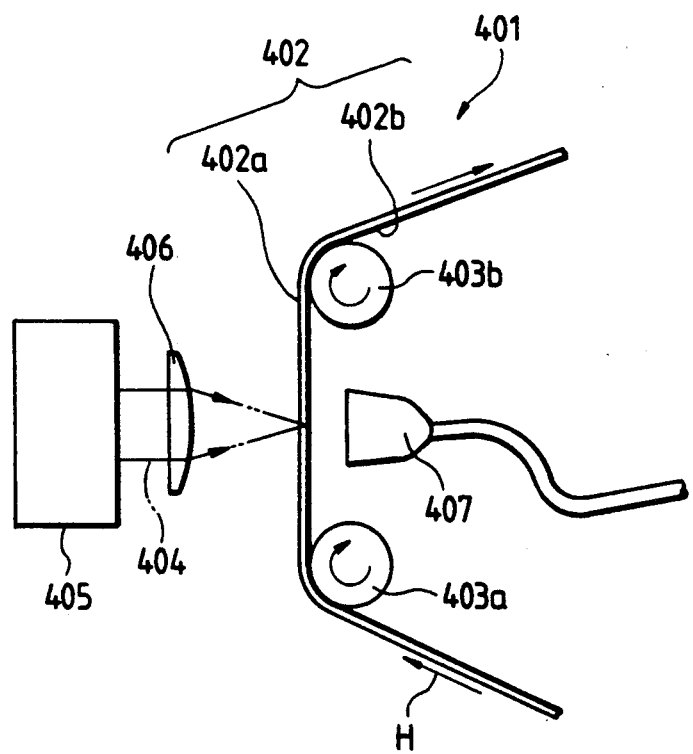
FIGS. 13 and 14 are explanatory diagrams showing essential components of first and second examples a laser processing apparatus for processing a membrane-covered laser beam transmitting material according to a fourth aspect of the invention, respectively.

As shown in FIG. 13, the laser processing apparatus 401 of the invention comprises: material guide means, namely, rollers 403a and 403b positioned spaced apart from each other to guide a membrane-covered laser beam transmitting material 402 (hereinafter referred to merely as "a workpiece 402", when applicable). That is, the rollers 403a and 403b are used for guiding the workpiece 402 vertically at a laser beam irradiation position.

A laser oscillator 405 for generating a laser beam, and a laser beam applying means including a light-gather optical system 406 are provided on the side of the laser beam transmitting material 402a of the membrane-covered laser beam transmitting material 402 which is not guided by the rollers 403a and 403b yet. The dust collecting inlet 407 of a dust collecting means is disposed on the side of the membrane of the membrane-covered laser beam transmitting material 402 in such a manner that it confronts through the membrane-covered laser beam transmitting material 401 with the laser beam applying means.

With the laser processing apparatus thus constructed, the membrane 402b of the membrane-covered laser beam transmitting material 402 is processed as follows: The membrane-covered laser beam transmitting material 402 is conveyed in the direction of the arrow H while being guided by the guide rollers 403a and 403b in such a manner that, at the laser beam irradiation position, the membrane-covered laser beam transmitting material 402 is held vertical, and the laser beam transmitting material 402a thereof is confronted with the laser beam applying means comprising the laser oscillator 405 and the light-gathering optical system 406, and accordingly the membrane 402b is confronted with the dust collecting means with the dust collector inlet 407. The laser beam 404 outputted by the laser beam applying means reaches the membrane 402b through the laser beam transmitting material 402a, thus processing the membrane 402b. In this operation, the membrane 402b is partially evaporated and scattered in the form of particles, which are removed through the dust collecting inlet 407.

Figure 14:
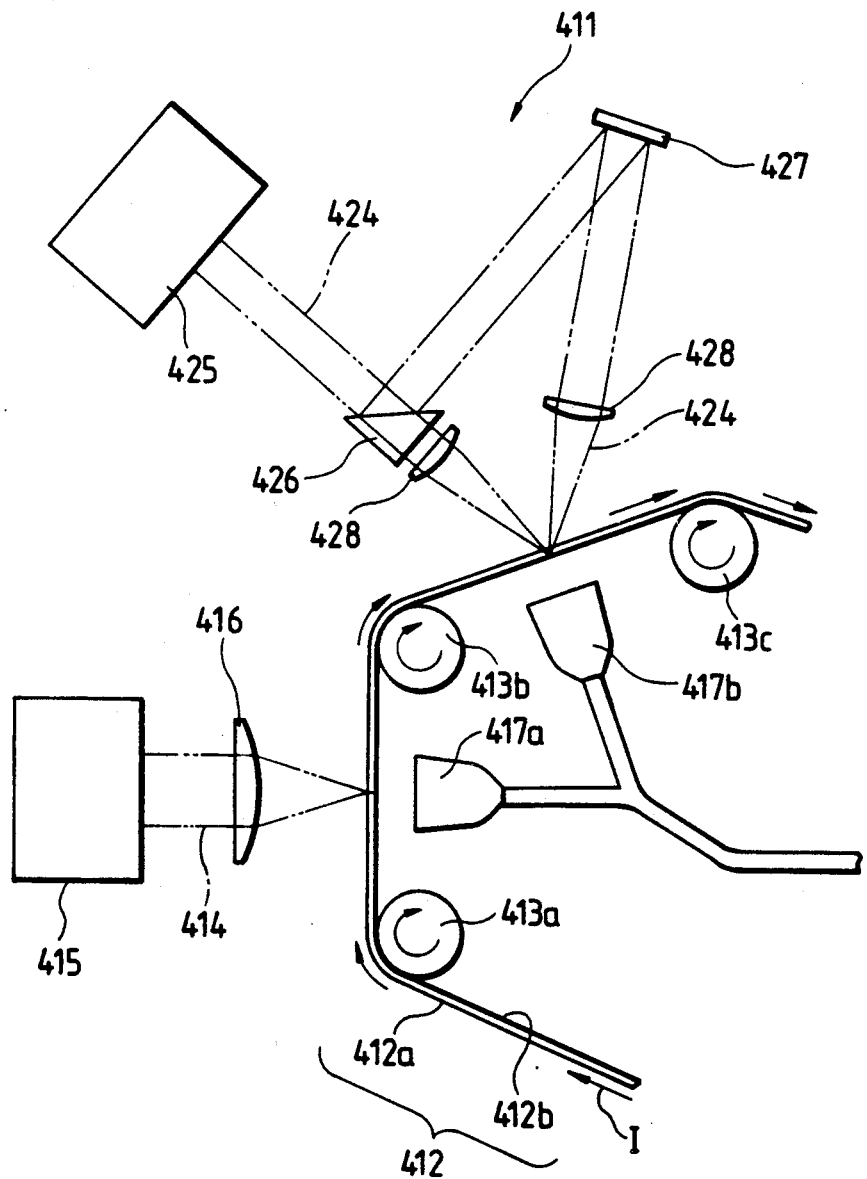

Another example of the laser processing apparatus according to the invention which is used to process a membrane-covered laser beam transmitting material is as shown in FIG. 14.

The laser processing apparatus comprises guide means, namely, rollers 413a, 413b and 413c provided at different positions to guide a membrane-covered laser beam transmitting material 412. More specifically, the rollers are so positioned that, at one laser beam irradiation position, the rollers 413a and 413b guide the membrane-covered laser beam transmitting material 412 vertically, and at another laser beam irradiation position, the rollers 413b and 413c guide it with its membrane 412b faced downwardly.

In the apparatus, a laser oscillator 415 for generating a laser beam, and a light-gathering optical system 416 for concentrating a laser beam form a first laser beam applying means. The first laser beam applying means is located between the rollers 413a and 413b in such a manner that it is on the side of the laser beam transmitting material 412a which is not in contact with the rollers. A dust collecting inlet 417a of a dust collecting means is positioned on the side of the membrane 412 in such a manner that it confronts through the membrane-covered laser beam transmitting material 412 with the above-described laser beam applying means.

The apparatus further comprises a second laser beam applying means which includes: a laser oscillator 425 for generating a laser beam: a beam splitter 426 for splitting the output laser beam 424 of the laser oscillator 425; a reflector 427 for reflecting the laser beam 424 thus split; and first and second light-gathering optical systems 428 and 428 for concentrating the laser beam 424 passed through the beam splitter and the laser beam 424 reflected by the reflector, respectively. The second laser beam applying means is provided between the rollers 413b and 413c in such a manner that it is located on the side of the laser beam transmitting material 412a. Similarly, another dust collecting inlet 417b of the dust collecting means is positioned on the side of the membrane 412b in such a manner that it confronts through the membrane-covered laser beam transmitting material 412 with the above-described second laser beam applying means.

With the laser processing apparatus thus constructed, the membrane 412b of the membrane-covered laser beam transmitting material is processed as follows: The membrane-covered laser beam transmitting material 412 is conveyed in the direction of the arrow I while being guided by the rollers 413a, 413b and 413c in such a manner that it is vertical at a first laser beam applying position between the rollers 413a and 413b with the laser beam transmitting material 412a faced towards the laser beam applying means (including the light-gathering optical system 416) and accordingly with the membrane 412b faced towards the dust collecting inlet 417a; and it is sloped at a second laser beam applying position between the rollers 413b and 413c with the laser beam transmitting material 412a faced towards the second laser beam applying means (including the first and second light-gathering optical systems 428 and 428) and accordingly with the membrane 412b faced towards the second dust collecting outlet 417b.

Under this condition, the first laser beam applying means applies the laser beam to the membrane-covered laser beam transmitting material 412 which is deflected horizontally in a scanning mode with the aid of a polygon mirror (not shown) for instance. The laser beam thus applied passes through the laser beam transmitting material 412a to the membrane 412b, thus processing the latter in a widthwise direction (that is, in a direction crossing the direction of conveyance). In the processing operation, the membrane is partially evaporated or scattered in the form of particles, which is removed through the dust collecting inlet 417a. Thereafter, at the second laser beam irradiation position between the rollers 413b and 413c, where the membrane-covered laser beam transmitting material 412 is sloped, the second laser beam applying means applies the laser beam 424 to it. The laser beam 424 is slit by the beam splitter 426 into the first and second laser beams. Those laser beams are applied through the respective optical systems 428 and 428 to the membrane-covered laser beam transmitting material 412, thus reaching the laser beam transmitting material 412a to the membrane 412b. As a result, the membrane 412b is processed in the direction of conveyance. In the processing operation, the particles evaporated from the membrane are removed through the dust collecting inlet 417b of the dust collector (not shown).

As is apparent from the above description, with the laser processing apparatus 411 the membrane 412b of the membrane-covered laser beam transmitting material 412 can be processed both in the direction of conveyance and in a direction crossing the former at the same time.

As was described above, in the laser processing apparatus comprising the laser beam applying means for applying a laser beam to a membrane-covered laser beam transmitting material to process its membrane, according to the invention, the material guide means are arranged at different positions to guide the membrane-covered laser beam transmitting material, the laser beam applying means are positioned on the side of the laser beam transmitting material which is not brought into contact with the material guide means in conveyance, and the dust collecting means are provided on the side of the membrane of the membrane-covered laser beam transmitting material in such a manner that they are confronted through the membrane-covered laser beam transmitting material with the laser beam applying means. Therefore, in the laser processing operation, the particles splashed or scattered from the membrane will not stick onto the laser beam applying means or the membrane-covered laser beam transmitting material; that is, the laser beam applying means and the membrane-covered laser beam transmitting material are protected from being smudged by the particles scattered from the membrane. Hence, with the apparatus, the membrane can be processed with high efficiency and with high accuracy, and maintenance of the laser beam applying means can be achieved with ease.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A laser processing apparatus for processing a membrane of a membrane-covered film with a laser beam in a direction of conveyance of said membrane-covered film and in a direction crossing the direction of conveyance, which comprises:
   a widthwise direction Q switch laser processing unit including a widthwise direction Q switch laser oscillator, a beam configuration changing means, a polygon mirror, and a lens unit comprising an f-θ lens and a cylindrical lens; and
   a conveyance direction Q switch layer processing unit including a conveyance direction Q switch laser oscillator, a laser splitter, a plurality of optical fiber cables; and a plurality of laser beam applying heads.

2. An apparatus as claimed in claim 1, in which said beam configuration changing means is adapted to covert a laser beam generated by said widthwise direction Q switch laser oscillator into a laser beam elliptic in section.

3. An apparatus as claimed in claim 2, which further comprises: means for turning said beam configuration changing means so that the direction of the major diameter of said laser beam elliptic in section coincides with a laser beam processing direction.

4. An apparatus as claimed in claim 1, in which said beam configuration changing means comprises:
   Y-direction beam configuration changing means for increasing or decreasing the diameter of said laser beam in a Y-direction; and
   X-direction beam configuration changing means for increasing or decreasing the diameter of said laser beam in an X-direction which is perpendicular to said Y-direction.

5. An apparatus as claimed in claim 1, in which a plurality of film guide means for guiding said membrane-covered film are provided at different positions;
   said widthwise direction Q switch laser processing unit has a laser applying member which is arranged between said film guide means in such a manner as to be positioned on the side of the film of said membrane-covered film; and
   dust collecting means provided on the side of the membrane of said membrane-covered film in such a manner as to confront through said membrane-covered film with said laser applying member.

6. A method of applying a scanning laser beam to a workpiece to be processed therewith, comprising the steps of:
   converting a laser beam generated by a laser oscillator into a laser beam elliptic in section with a beam configuration changing means;
   deflecting said laser beam elliptic in section in a scanning mode with a reflecting optical system, said reflecting optical system rotating with a rotation speed proportional to a conveyance speed of said workpiece and generating said scanning laser beam; and
   applying said scanning laser beam to said workpiece;
   and wherein said beam configuration changing means is turned with a speed proportional to said rotation speed of said reflecting optical system so that the direction of the major diameter of said laser beam elliptic in section coincides with the direction of scan of said scanning laser beam applied to said workpiece.

* * * * *